United States Patent [19]

Ohishi et al.

[11] Patent Number: 5,621,491
[45] Date of Patent: Apr. 15, 1997

[54] VIBRATION DETECTION APPARATUS

[75] Inventors: Sueyuki Ohishi, Tokyo; Nobuhiko Terui, Ichikawa, both of Japan

[73] Assignee: Nikon Corporation, Tokyo, Japan

[21] Appl. No.: 377,794

[22] Filed: Jan. 24, 1995

[30]     Foreign Application Priority Data

Mar. 10, 1994  [JP]  Japan .................................. 6-040023

[51] Int. Cl.⁶ .......................... G03B 39/00; G03B 17/00; G03B 7/08
[52] U.S. Cl. ................................................ 396/52
[58] Field of Search ........................ 354/70, 202, 430; 348/208; 359/557

[56]             References Cited

U.S. PATENT DOCUMENTS

| 4,876,903 | 10/1989 | Budinger ............................... 73/865.1 |
| 4,989,611 | 2/1991 | Zanetti et al. ........................... 128/695 |
| 5,178,018 | 1/1993 | Gill ........................................ 73/861.28 |
| 5,192,964 | 3/1993 | Shinohara et al. ..................... 354/202 |

*Primary Examiner*—Safet Metjahic
*Assistant Examiner*—Eddie C. Lee

[57]             ABSTRACT

A vibration detection apparatus includes a vibration detector for detecting a vibration generated in a target detection object and outputting a detection result, and a one-chip microcomputer. The one-chip microcomputer incorporates an A/D converter having a resolution of at least 10 bits and causes the A/D converter to perform A/D conversion of an output from the vibration detector.

18 Claims, 15 Drawing Sheets

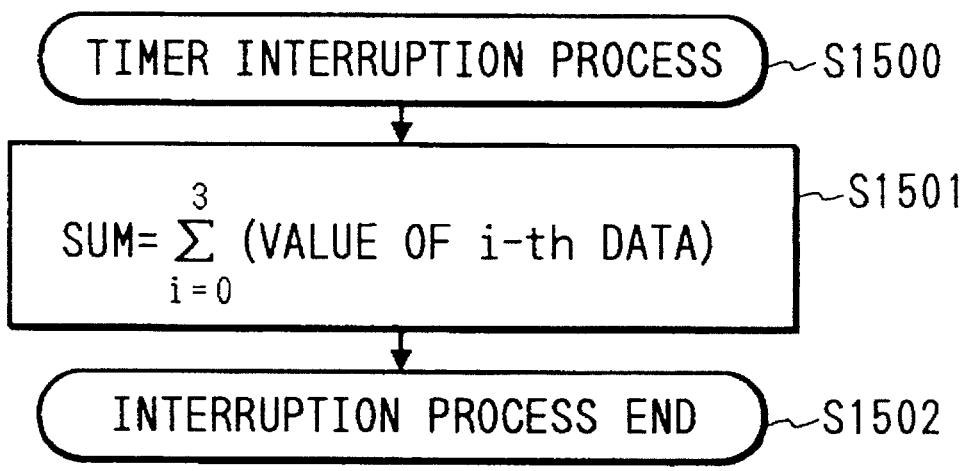
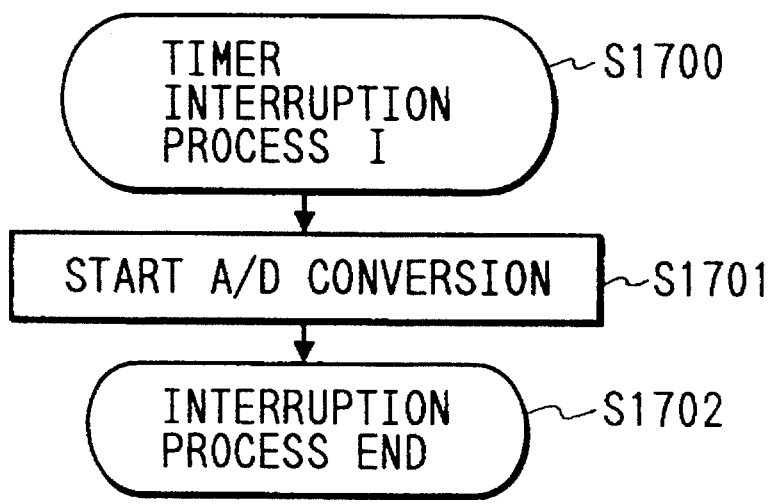

VIBRATION DETECTION APPARATUS

BACKGROUND OF THE INVENTION

1. Field of the Invention

The present invention relates to an apparatus for detecting a vibration generated in a target detection object.

2. Related Background Art

As a target detection object for vibration detection, there are a still camera, a video camera, and the like. A vibration called a camera shake is generated in a camera during a photographing operation. When a camera shake is generated, and the photographing operation is performed in this state, the image is blurred in some cases, resulting in degradation in sharpness of an object for photographing. To solve this problem, a camera having a vibration reduction function has been proposed in which a vibration generated in the camera is detected, and the optical axis of a photographing optical system is changed in accordance with the detection result, thereby reducing the blur in image.

Conventionally, a camera having a vibration detection function, and particularly, a camera having a vibration reduction function have been proposed in which a camera shake generated in the camera is detected by a vibration detection circuit using an angular velocity sensor or the like, and the optical axis of the photographing optical system is changed in accordance with the detection amount, thereby suppressing the image blur. As a means for changing the optical axis of the photographing optical system, for example, a correction lens as one of the photographing lenses is shifted to change the optical axis. The means for changing the optical axis of the photographing optical system is driven by an actuator such as a motor. More specifically, when a motor is used, rotation of the motor is reduced by a gear or the like, and rotation of the gear is converted into a linear motion, thereby driving the correction lens.

One example of the vibration reduction operation will be described with reference to a circuit diagram shown in FIG. 22. FIG. 22 is a circuit diagram for schematically explaining the prior art in association with a portion related to the present invention. A vibration detection circuit 5 detects a vibration generated in a camera. The vibration detection circuit 5 detects an angular velocity generated in the camera by using, e.g., an angular velocity sensor, thereby outputting a signal proportional to the angular velocity. The output from the vibration detection circuit 5 is output to a CPU 1 constituted by a one-chip microcomputer. The CPU 1 controls a motor 4 by a motor drive circuit 2 in accordance with the output value from the vibration detection circuit 5. With this operation, a correction lens 8 in photographing lenses 6 to 9 is shifted to change the optical axis, thereby canceling the vibration on the image surface. A lens velocity detection circuit 3 for detecting the position and shift velocity of the correction lens 8 detects the actual shift velocity of the correction lens 8 at this time, and feedback control is performed by the CPU 1 in accordance with the detected velocity. As the shift directions of the correction lens 8, normally, two axes perpendicular to each other and also perpendicular to the optical axis are necessary to drive the correction lens 8 in a plane perpendicular to the optical axis. However, the mechanisms for shifting the lens in these directions have the same arrangement, and only the mechanism for one axis is illustrated in FIG. 22. When an angular velocity sensor is used, an output value from the vibration detection circuit 5 changes in accordance with the angular velocity generated by the vibration of the camera. The CPU 1 converts (A/D-converts) the output value from the vibration detection circuit 5 into a digital value by an A/D converter with an 8-bit resolution, which is incorporated in the CPU 1, thereby detecting the angular velocity generated due to the camera shake. Since the vibration must be detected in real time, an output from the vibration detection circuit 5 is A/D-converted at a relatively short predetermined sampling interval of, e.g., 1 ms. Rotation of the motor 4 is converted into a linear motion by an appropriate gear or the like (not shown) to drive the correction lens 8.

However, the vibration reduction system with this arrangement has the following problems. The resolution of the A/D converter incorporated in the one-chip microcomputer used in a camera having the conventional vibration reduction function is as low as 8 bits. The operation of the A/D converter with an 8-bit resolution, which is incorporated in the CPU 1, will be described below with reference to FIG. 23. In the A/D converter incorporated in the CPU 1, the output terminal of the vibration detection circuit 5 is connected to the input side (A/D input) of a signal to be A/D-converted, and a reference voltage for A/D conversion, which serves as a reference voltage for A/D conversion, is applied to the other input terminal from the outside of the CPU 1. The output voltage from the vibration detection circuit 5 is converted into a digital value of 8 bits (values 0 to 255 in decimal notation) using the reference voltage for A/D conversion as a reference value, and the conversion result is stored in an A/D conversion result register. The data stored in the A/D conversion result register can be read out via an internal data bus as needed by executing a program written in a ROM (Read Only Memory) in the CPU 1. The relationship between the voltage input to the A/D input terminal and the digital value obtained upon A/D conversion is shown in FIG. 3. When the A/D input voltage is 0 V, the A/D conversion result obtained upon conversion by the A/D converter is 0. When the same voltage as the reference voltage for A/D conversion is input, the A/D conversion result is 255. Digitized values between an input voltage of 0 V and the reference voltage for A/D conversion are 256 levels, so that an A/D conversion result corresponding to an A/D input voltage can be obtained.

An angular velocity due to a camera shake often falls within a range of −20°/sec to +20°/sec under the normal use conditions of a compact camera. The vibration detection circuit 5 is a circuit for detecting an angular velocity generated due to the camera shake. Assume that the vibration detection circuit 5 outputs a voltage of 0 V when an angular velocity is −20°/sec, a voltage corresponding to ½ the reference voltage for A/D conversion in a stationary state, and the reference voltage for A/D conversion when an angular velocity is +20°/sec. Also assume that A/D conversion can be performed within an angular velocity range of −20°/sec to +20°/sec due to the normal camera shake. In this case, the angular velocity with respect to the quantization unit (1 LSB) of a digitized value with an 8-bit resolution corresponds to about 0.156°/sec. In the other word, an angular velocity of 0.156°/sec or less cannot be recognized by the A/D converter with 8-bit resolution. That is, this "unrecognizability" causes an error of 0.156° in one second. Therefore, when a photographing operation is performed using a photographing lens having a focal length of 105 mm at a shutter speed of ¼ second, an error of 105 mm×tan(0.156°)×(¼ second)≈71 μm is generated on the image surface. If the focal length of the photographing lens is large, or if the shutter speed is lower, a larger error is generated. Actually, since the output varies depending on the vibration detection circuit 5, vibration detection circuits do not output a predetermined output value even at a predetermined angular velocity. Additionally, the vibration detection circuit 5 often has an arrangement in which an output from the angular velocity sensor is amplified by an operational amplifier or the like and output. In this case, the lower limit of the output is only about 1 V, and the upper limit almost corresponds to (power supply voltage–1 V) because of the characteristics of the operational amplifier. For this reason, the vibration detection circuit 5 is designed to ensure a large margin with respect to a detection range of the angular velocity due to the camera shake. For example, assume that the power supply voltage of the vibration detection circuit 5 is 5 V, the reference voltage for A/D conversion is 5 V, an output range of the vibration detection circuit 5 is 1 to 4 V, and an output voltage of 2.5 V can be obtained in a stationary state. In this case, if an angular velocity of –20°/sec to +20°/sec, which is generated due to a camera shake, is to be detected, an angular velocity with respect to 1 LBS of the A/D converter corresponds to about 0.26°/sec. When a photographing operation is performed using a photographing lens having a focal length of 105 mm at a shutter speed of ¼ second, an error on the image surface almost reaches 119 μm. Normally, a vibration amount on the image surface must be about 50 μm to obtain a picture with an ignorable image blur by a camera using a silver halide film. This error amount is very large.

There is a detection system for vibration reduction, in which an A/D converter with a 10-bit resolution is arranged outside a microcomputer in the vibration reduction system of a video camera so as to decrease the above-described error due to the resolution of the A/D converter. However, this system poses a problem of cost because of the externally arranged A/D converter. In addition, as compared to a one-chip microcomputer incorporating an A/D converter, a program for controlling the external A/D converter, e.g., a program for starting or stopping A/D conversion, or transferring an A/D conversion result to the one-chip microcomputer through communication with the A/D converter is additionally required. Furthermore, to perform vibration reduction, an output from the vibration detection circuit 5 must be detected in real time, and the correction lens 8 must be controlled in real time in accordance with the detected vibration amount, as described above. If a shutter (not shown) and the like are to be controlled by a single one-chip microcomputer, this control process is also required. Control of the external A/D converter increases processes. A high-performance one-chip microcomputer capable of simultaneously performing these control processes is very expensive.

In A/D conversion of an output from the vibration detection circuit 5, some A/D converters require a long time for A/D conversion until the result is stored in an A/D conversion result register. Some A/D converters require a time of about 100 μsec at maximum. The CPU 1 performs a process of detecting a vibration generated in the camera from the output from the vibration detection circuit 5, and at the same time, performs a vibration reduction process in which the correction lens 8 is shifted to correct the camera shake. When these processes are performed after the end of A/D conversion, the process may be delayed.

Additionally, an output from the vibration detection circuit 5 is a vibration signal (normally, at a frequency of 1 to 15 Hz) generated in the camera, which vibration signal is overlapped with high-frequency noise generated in the angular velocity sensor constituting the vibration detection circuit 5, the amplifier for amplifying the signal from the angular velocity sensor, and the like. Because of this high-frequency noise, even an A/D converter with a high resolution cannot exhibit its best performance.

SUMMARY OF THE INVENTION

The conventional vibration detection device such as a vibration reduction system has the above problems. The present invention has as its object to suppress an error due to the resolution of the A/D converter or the influence of high-frequency noise generated in the vibration detection circuit by a relatively simple method, thereby improving the vibration detection precision and process efficiency, enabling highly precise vibration detection, and preventing an increase in cost.

In order to achieve the above object, according to the present invention, there is provided a vibration detection device comprising a vibration detector for detecting a camera shake generated in a camera, and a one-chip microcomputer, wherein the one-chip microcomputer incorporates an A/D converter having a resolution of at least 10 bits, and an output from the vibration detector is A/D-converted by the A/D converter.

According to the vibration detection device of the present invention, the vibration detection precision can be improved, cost reduction can be achieved as compared to a case wherein an A/D converter having a resolution of at least 10 bits is arranged outside the one-chip microcomputer, and a process such as control or communication of the external A/D converter can be eliminated.

When the vibration detection device is constituted to perform A/D conversion a plurality of times, and a sum value of a plurality of A/D conversion results or an average value thereof is calculated, the influence of high-frequency noise generated in the vibration detection circuit can be suppressed, thereby further improving the vibration detection precision.

BRIEF DESCRIPTION OF THE DRAWINGS

FIG. 15 is a flow chart showing the timer interruption process of the present invention;

FIG. 17 is a flow chart showing the timer interruption process I of the present invention;

DETAILED DESCRIPTION OF THE PREFERRED EMBODIMENTS

As a target detection object for vibration detection of the present invention, a camera will be exemplified below. This camera has a vibration reduction function in which a vibration generated in the camera is detected, and the optical axis of a photographing optical system is changed in accordance with the detection result, thereby reducing an image blur.

Figure 1:
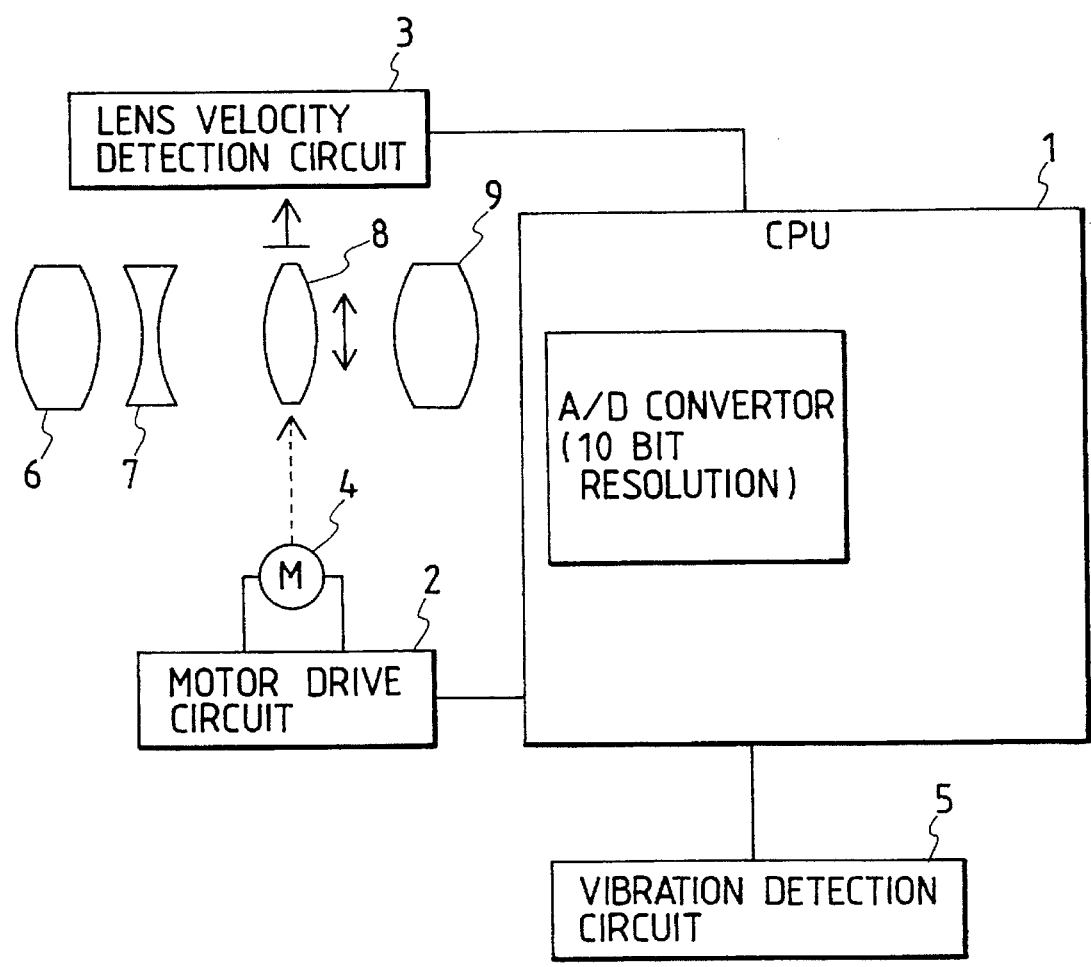
FIG. 1 is a circuit diagram schematically showing a camera having an anti-vibration function as an embodiment of the present invention.
Figure 22:
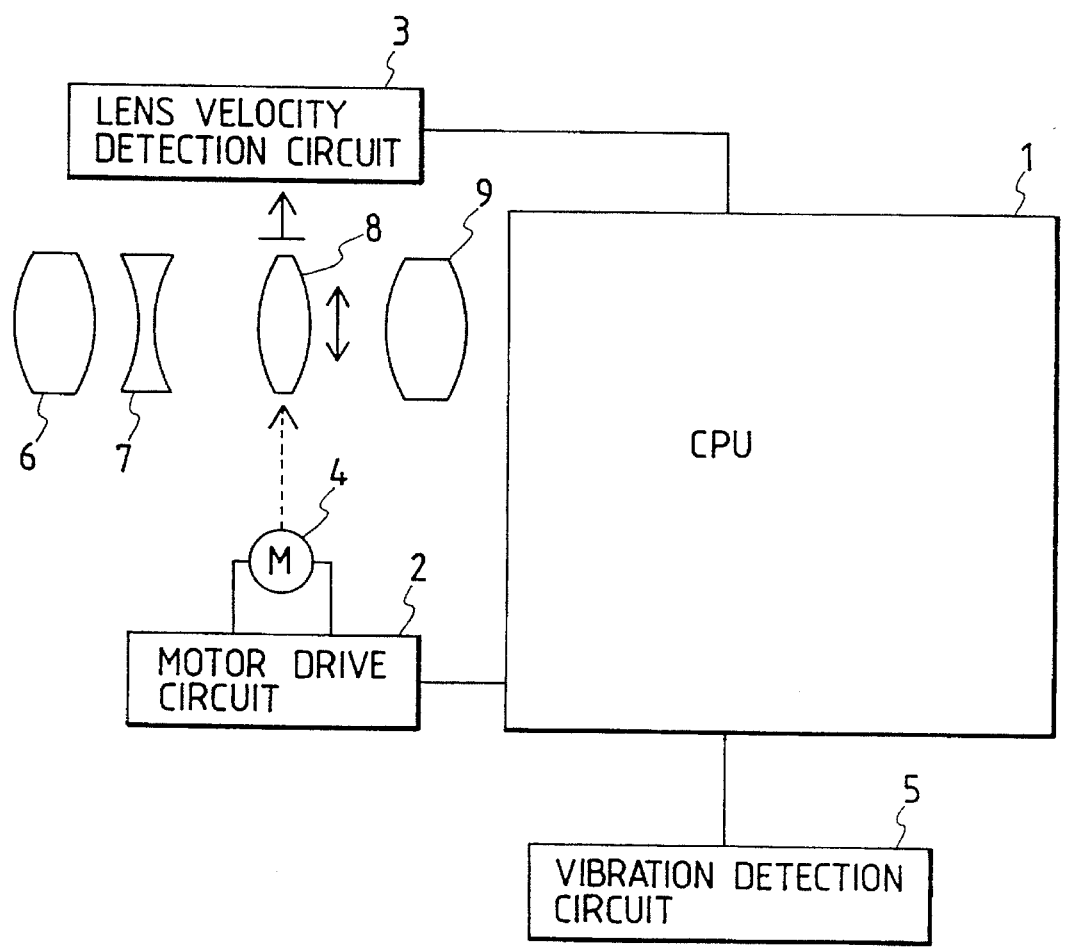
FIG. 22 is a circuit diagram schematically showing a camera having an anti-vibration function of the prior art.

A circuit diagram shown in FIG. 1 in association with an embodiment of the present invention is similar to the circuit arrangement of the prior art shown in FIG. 22. This embodiment is different from the prior art in the arrangement of an A/D converter incorporated in a CPU 1 and the internal process of the CPU 1.

Figure 4:
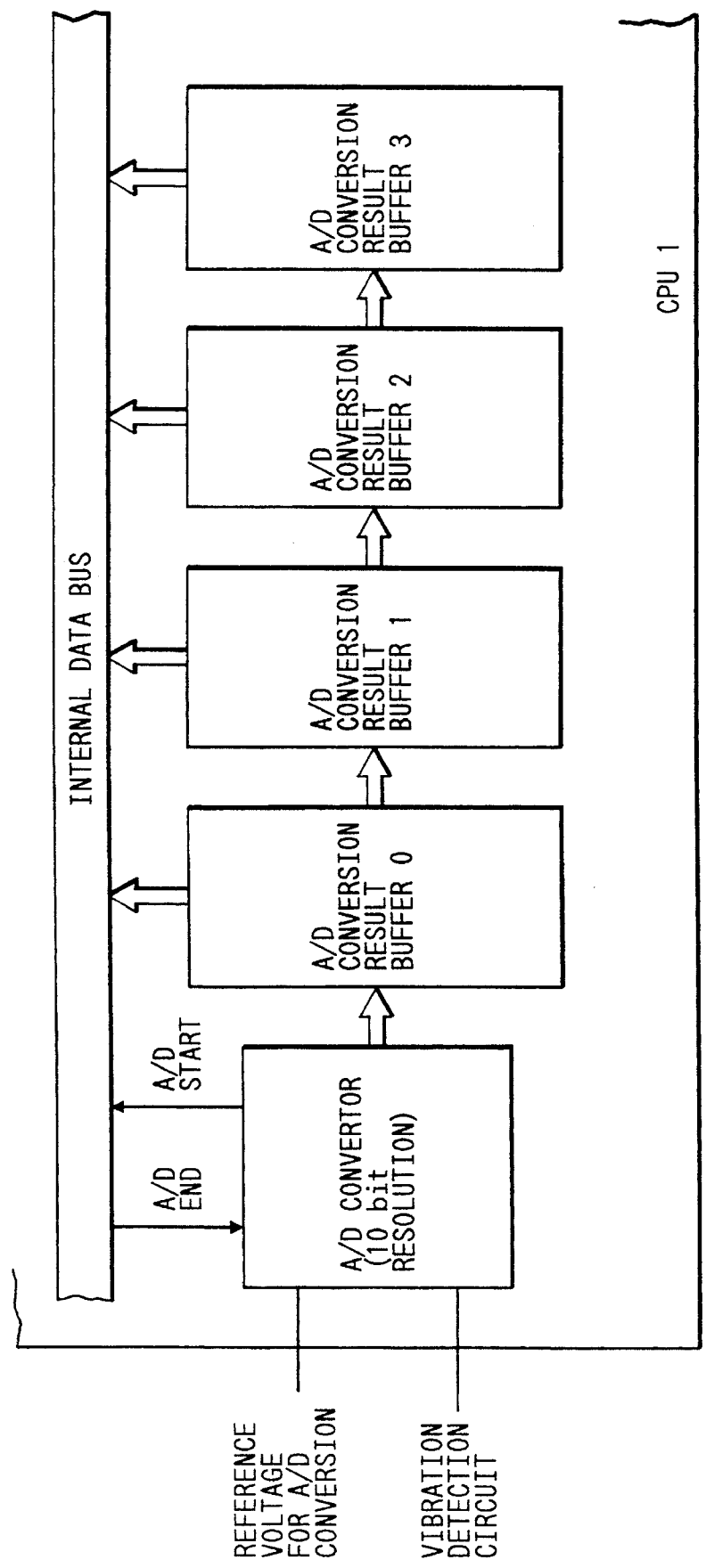
FIG. 4 is a view showing the A/D converter incorporated in the one-chip microcomputer in the present invention.
Figure 5:
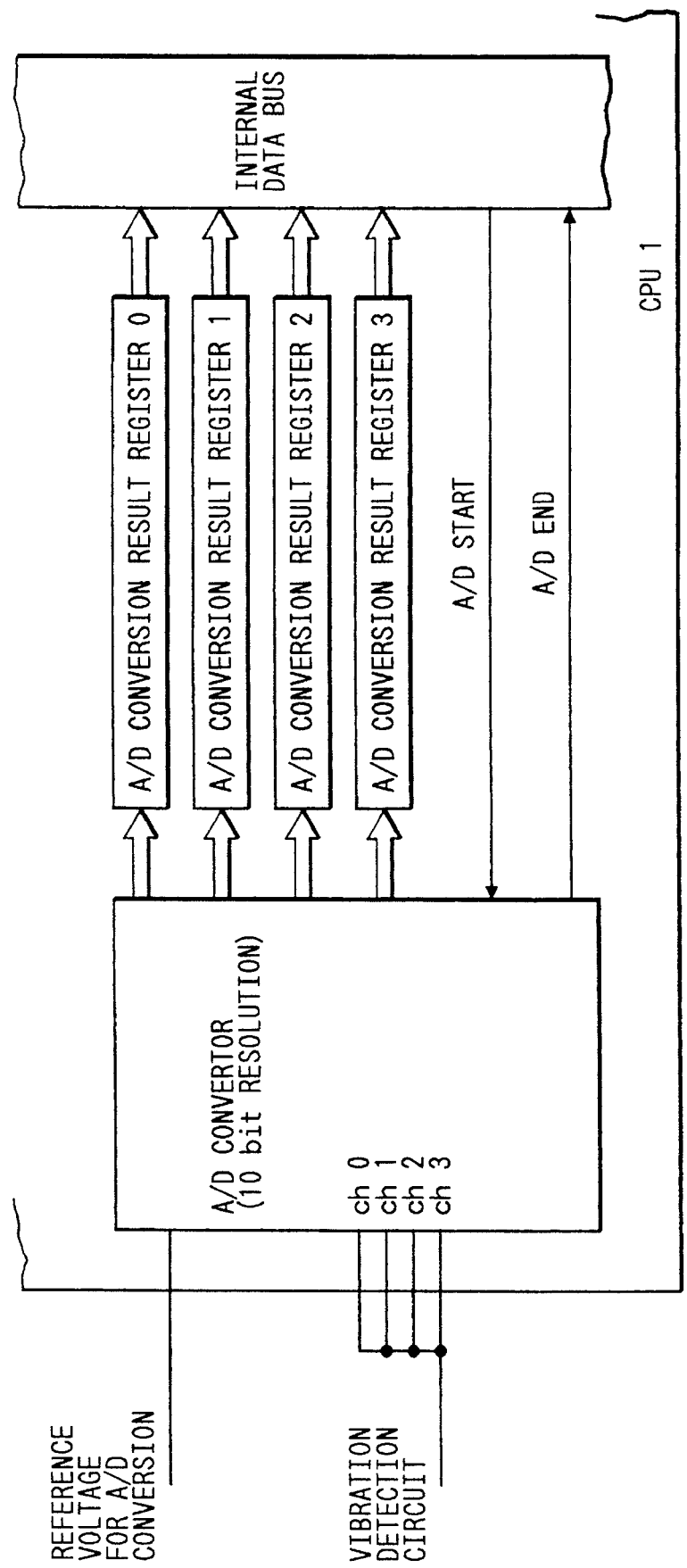
FIG. 5 is a view showing the A/D converter incorporated in the one-chip microcomputer in the present invention.
Figure 6:
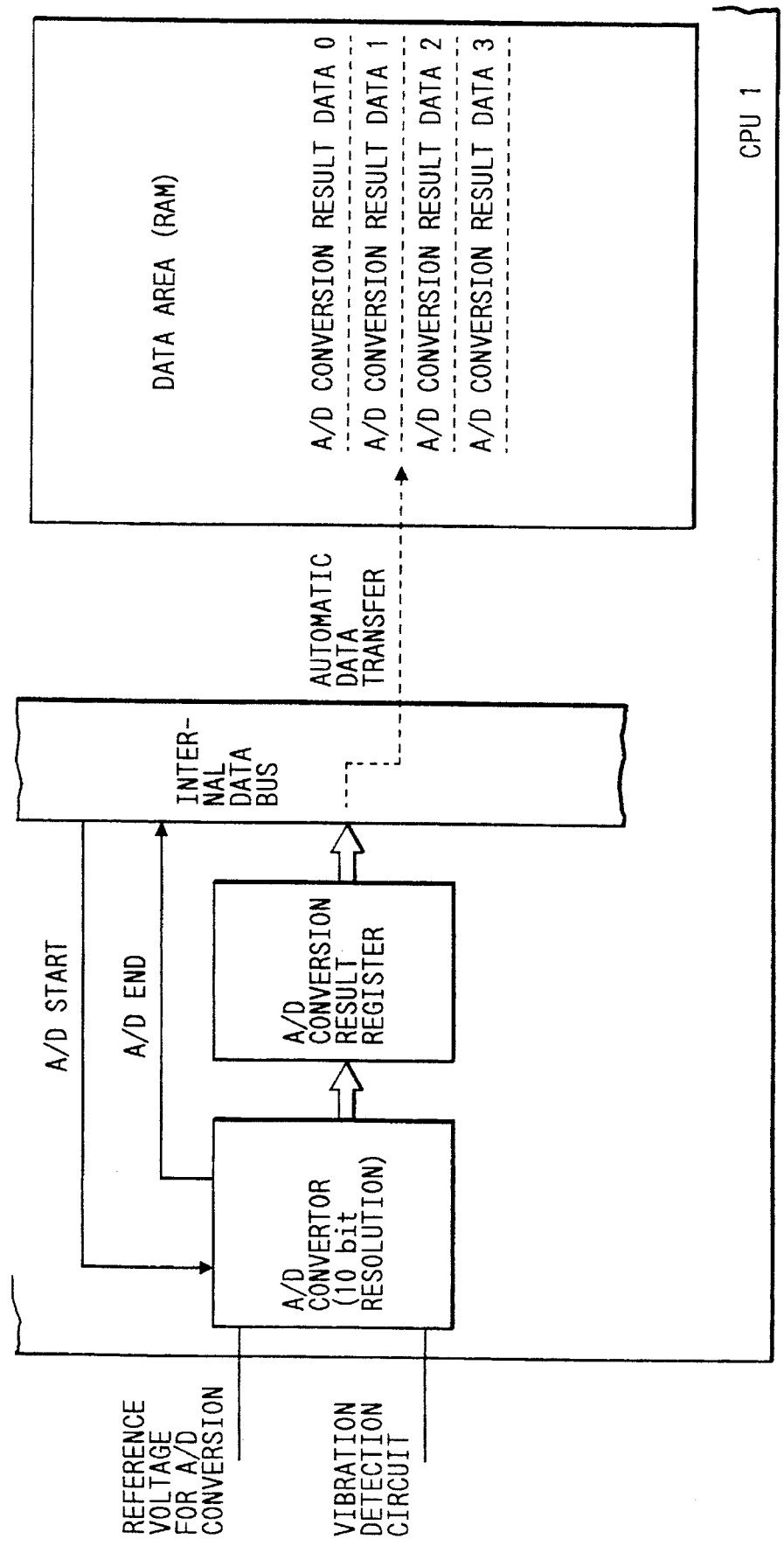
FIG. 6 is a view showing the A/D converter incorporated in the one-chip microcomputer and auto-transfer of an A/D conversion result in the present invention.

1. Arrangement for Improving the Quantization Resolution of A/D Conversion (1) Arrangement in which an A/D Converter having a Resolution of at least 10 Bits is Incorporated in a One-chip Microcomputer In this embodiment, as shown in FIGS. 4 to 6, an A/D converter with a 10-bit resolution is incorporated in the CPU 1 to perform A/D conversion of an output from a vibration detection circuit 5.

Figure 23:
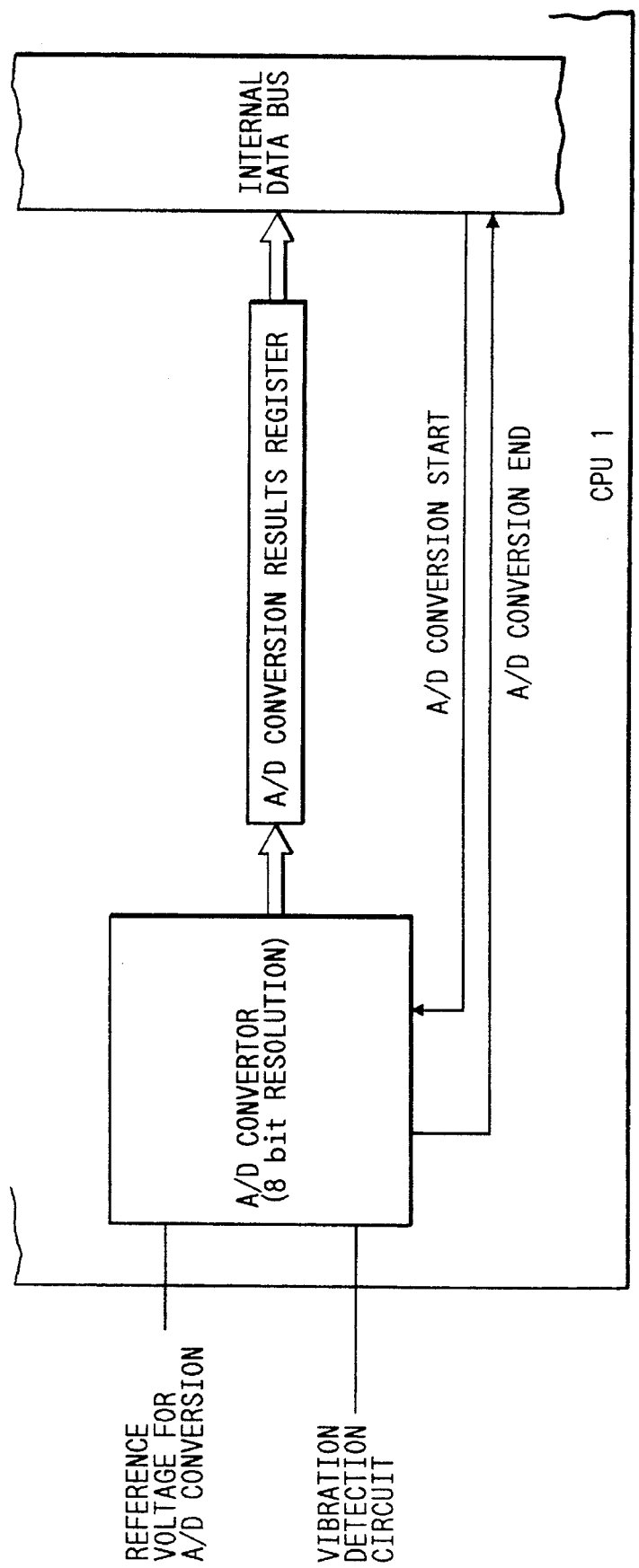
FIG. 23 is a view showing a one-chip microcomputer incorporating an A/D converter of the prior art.

As in the above-described prior art, when the resolution of the A/D converter incorporated in the CPU 1 is 8 bits, an angular velocity corresponding to 1 LSB of the A/D converter is about 0.26°/sec. When a photographing operation is performed using a photographing lens having a focal length of 105 mm at a shutter speed of ¼ second, an error on the image surface reaches about 119 μm. In this embodiment, the resolution of the A/D converter is improved from 8 bits to 10 bits. For this reason, 256 A/D input levels which are conventionally present between a voltage of 0 V and the reference voltage for A/D conversion increase to 1024 levels, thereby ensuring a four-time resolution. With this arrangement, an angular velocity corresponding to 1 LSB of the A/D converter becomes about 0.065°/sec, and when a photographing operation is performed using a photographing lens having a focal length of 105 mm at a shutter speed of ¼ second, an error on the image surface can be reduced to about 30 μm. Therefore, a sufficient precision for detection of a camera shake can be obtained. When the A/D converter with a 10-bit resolution is incorporated in the one-chip microcomputer as in this embodiment, a vibration reduction system can be constituted at a much lower cost than in a case wherein the A/D converter with a 10-bit resolution is arranged outside the CPU 1. In addition, an increase in process of the one-chip microcomputer, which is caused when the A/D converter is externally arranged, can be prevented. For example, a program for controlling the external A/D converter or transferring an A/D conversion result to the one-chip microcomputer through communication with the A/D converter becomes unnecessary. When the A/D converter with a 10-bit resolution is incorporated, an A/D conversion result register value is changed from 8-bit data to 10-bit data as compared to the A/D converter with an 8-bit resolution in the prior art shown in FIG. 23. Except for that, control of the incorporated A/D converter, e.g., control of starting or stopping A/D conversion is not changed. In this embodiment, the A/D converter with a 10-bit resolution is incorporated. However, the resolution of the A/D converter is not limited to 10 bits. When an A/D converter having a resolution of 12, 14, or 16 bits or more is incorporated, vibration detection can be performed at a higher precision, and a more precise vibration reduction system can be realized, as a matter of course.

2. Process of Performing A/D Conversion a Plurality of Times

Figure 2:
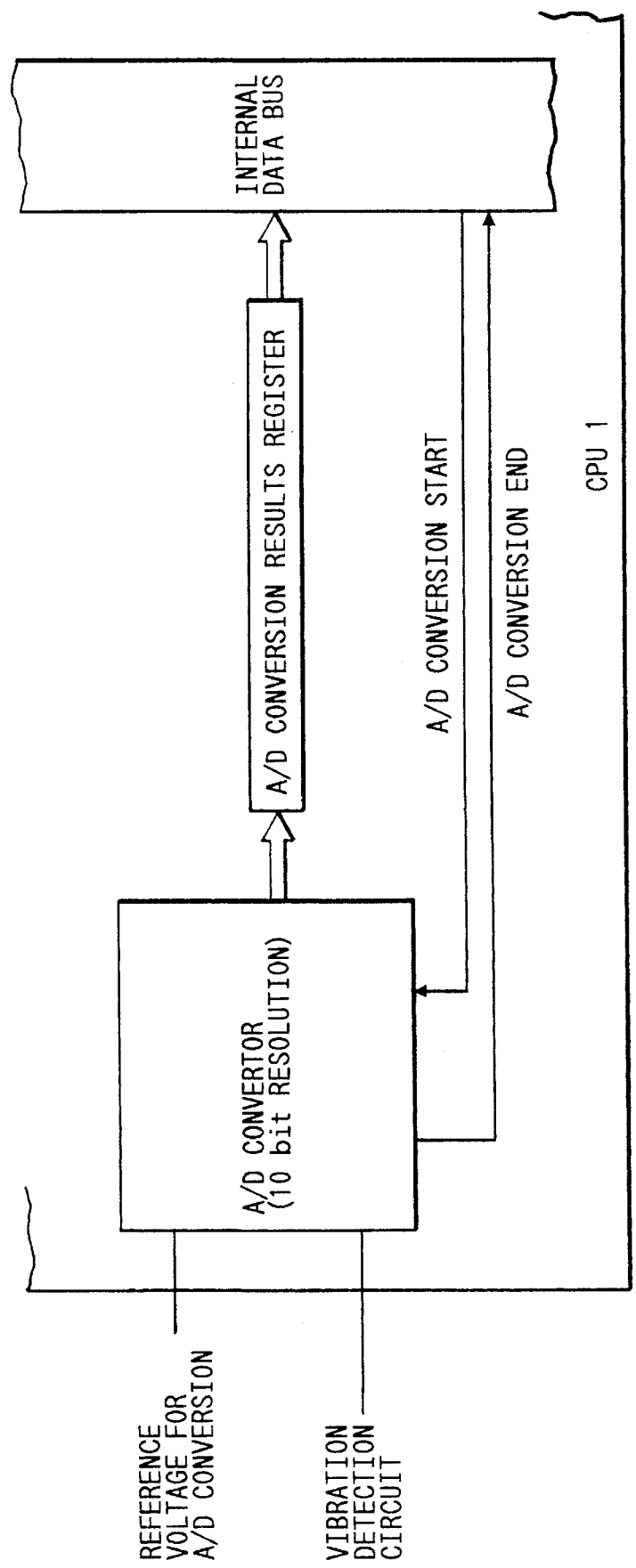
FIG. 2 is a view showing an A/D converter incorporated in a one-chip microcomputer in the camera of the embodiment.
Figure 3:
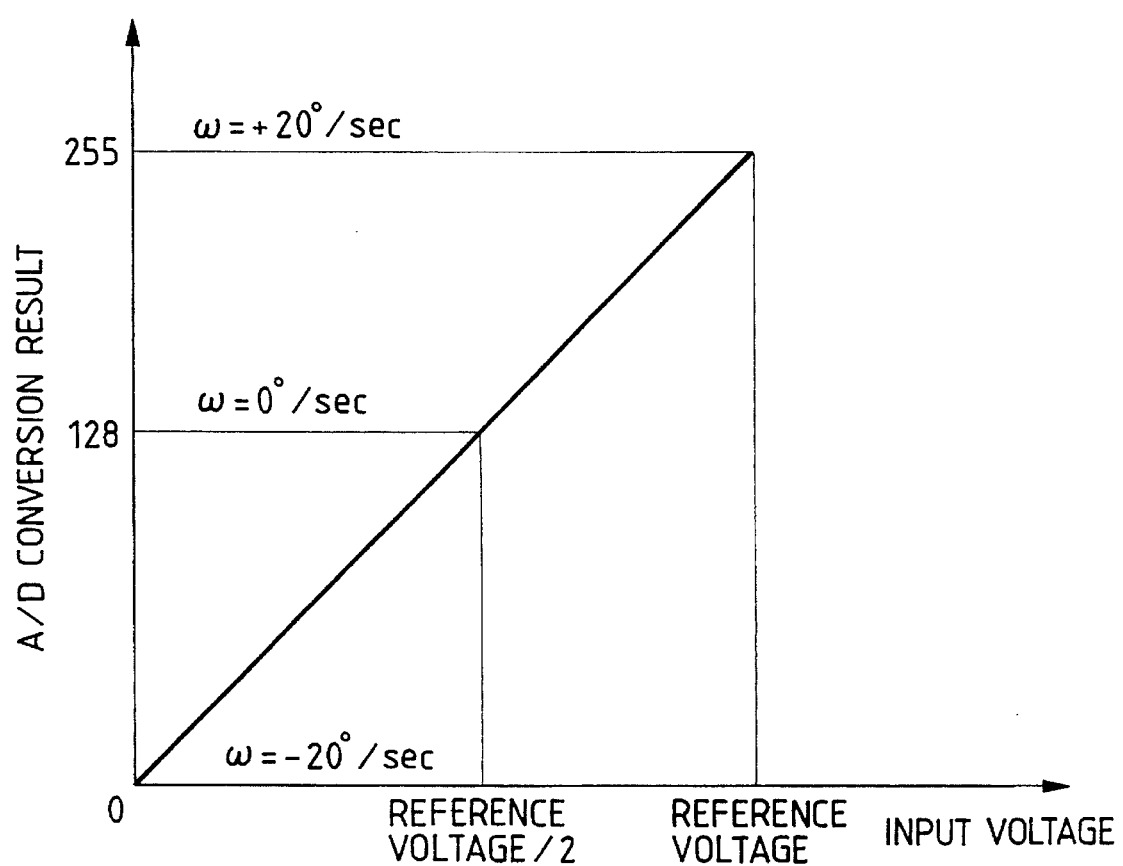
FIG. 3 is a graph showing a relationship between an A/D input and an A/D conversion result in the prior art.
Figure 7:
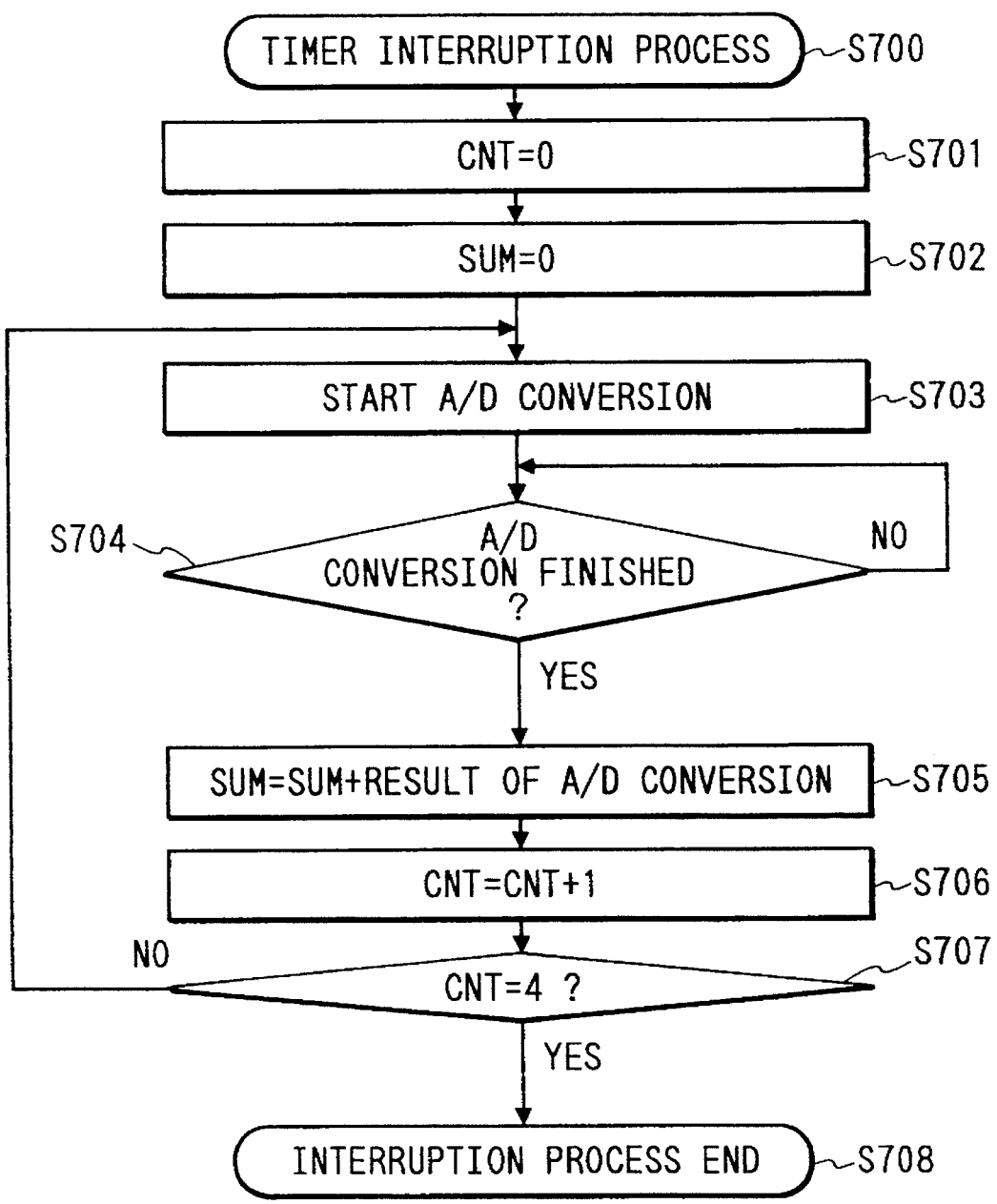
FIG. 7 is a flow chart showing the timer interruption process of the present invention.
Figure 21:
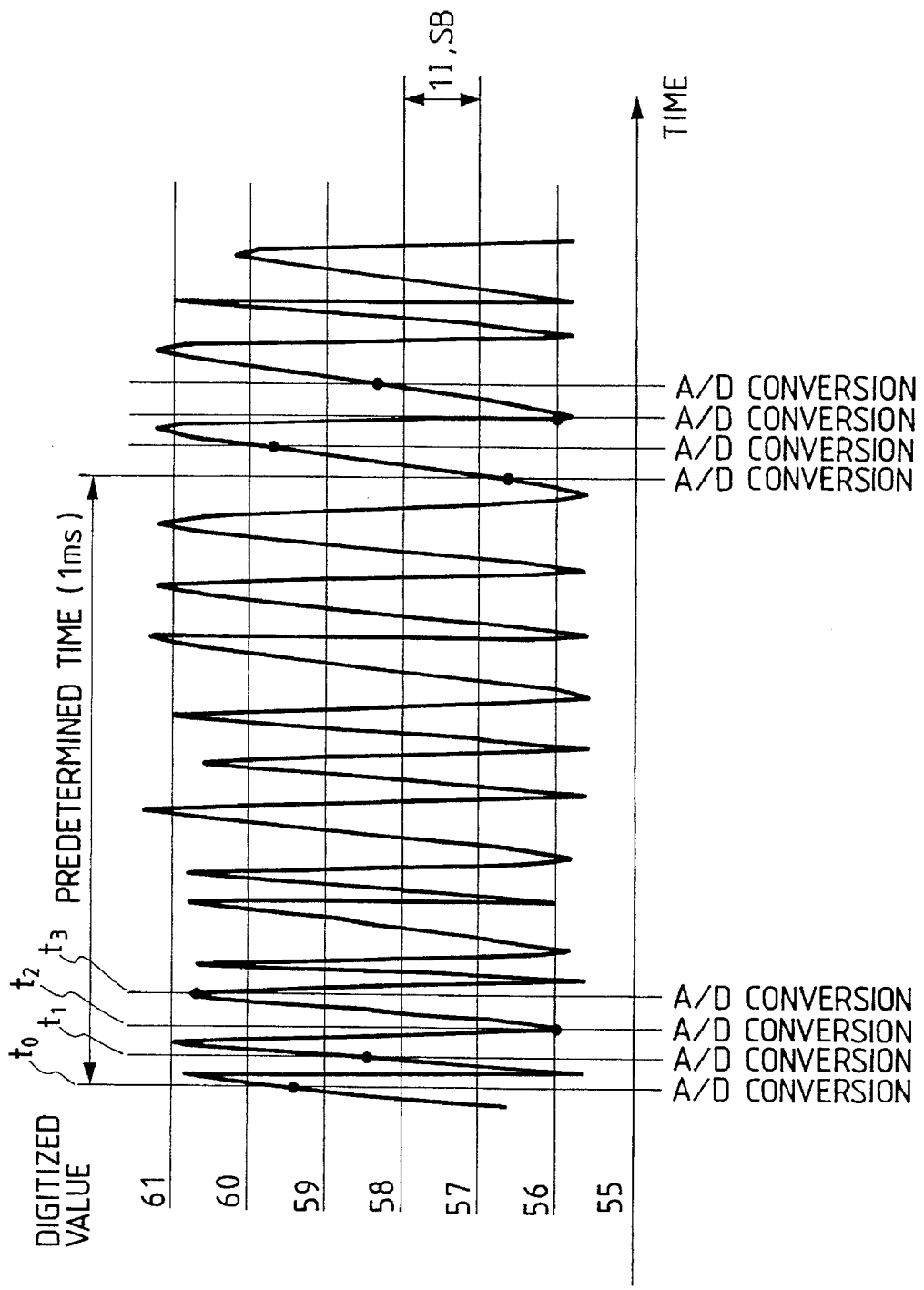
FIG. 21 is a view showing an output from a vibration detection circuit of the present invention in which A/D conversion is performed a plurality of times.

A process of removing high-frequency noise overlapping an output from the vibration detection circuit 5 will be described below. Referring to FIG. 2, an output from the vibration detection circuit 5 is input to the A/D input terminal of the A/D converter (10-bit resolution) incorporated in the CPU 1. The input waveform is shown in FIG. 21. In FIG. 21, the high-frequency noise overlaps the vibration waveform, and the digitized values vary from 55 to 61. In this embodiment, as shown in FIG. 21, A/D conversion is performed four times at a predetermined sampling interval of, e.g., 1 ms. The sum of the four digitized values is calculated to eliminate the influence of the high-frequency noise overlapping the vibration waveform. The process of removing the high-frequency noise overlapping the output from the vibration detection circuit 5 will be described below with reference to FIG. 7. A timer interruption process shown in the flow chart of FIG. 7 is performed every predetermined time, i.e., every 1-ms interval in this embodiment. The process is started in step S700. A value CNT representing the number of times of A/D conversion is cleared in step S701. A value SUM representing the sum of the A/D conversion results is cleared in step S702, and the flow advances to step S703. In step S703, the A/D converter is operated to start A/D conversion. In step S704, processing waits until A/D conversion started in step S703 is finished. If it is determined in step S704 that A/D conversion is finished, the A/D conversion result stored in an A/D conversion result register is added to the value SUM in step S705. The obtained value is substituted in the value SUM, and the flow advances to step S706. The value CNT is incremented by one in step S706, and the obtained value is substituted in the value CNT. It is determined in step S707 whether the value CNT is four, i.e., A/D conversion is performed four times, and the sum of four A/D conversion results is calculated. If NO in step S707, the flow returns to step S703. If YES in step S707, this timer interruption process is ended in step S708. The timings of A/D conversion will be described with reference to FIG. 21. The first A/D conversion is performed at a timing t0. Similarly, the second, third, and fourth A/D conversions are performed at timings t1, t2, and t3, respectively. Although the digitized values shown in FIG. 21 are different from each other, these variations are eliminated by calculating the sum of the digitized values. When a correction lens 8 is shifted in accordance with the value SUM obtained by this timer interruption process, the influence of the high-frequency noise generated in the vibration detection circuit 5 is suppressed, thereby enabling vibration reduction.

In this embodiment, the sum of four A/D conversion results is calculated, thereby suppressing the influence of the high-frequency noise. However, the number of times of A/D conversion is not limited to this. The sum of the A/D conversion results may be divided by the number of times of A/D conversion to obtain the average value of the A/D conversion results. The resolution of the A/D converter incorporated in the CPU 1 is not limited to 10 bits, and an A/D converter having a resolution higher than 10 bits may also be used. The process of calculating the sum of a plurality of A/D conversion results can be effectively applied to the conventional A/D converter with an 8-bit resolution to suppress the influence of the high-frequency noise.

3. Process of Improving the Efficiency of A/D Conversion

The process of removing the high-frequency noise overlapping the output from the vibration detection circuit 5 has been described above. Actually, a long time is required through A/D conversion until the result is stored in the A/D conversion result register, i.e., from step S703 to step S705 in FIG. 7. In some cases, a time of 10 to 100 µm is required. If A/D conversion is performed about four times, a process time of several hundreds µm is required while including the processes in steps S705 to S707. When a vibration generated in the camera is detected from the output from the vibration detection circuit 5, and a vibration reduction process is simultaneously performed to shift the correction lens 8 and reduce the image blur, the process of the CPU 1 may be delayed. In the present invention, the process time for A/D conversion is reduced by the following process.

(1) Process of Incorporating a Plurality of A/D Conversion Result Buffers

The first example for reducing the process time will be described with reference to FIG. 4. The A/D converter incorporated in the CPU 1 is constituted by an A/D conversion unit, an A/D conversion result buffer 0, an A/D conversion result buffer 1, an A/D conversion result buffer 3, and an A/D conversion buffer 4 for storing A/D conversion results. A/D conversion is started by the program of the CPU 1. Upon completion of A/D conversion, the A/D conversion result from the A/D conversion unit is stored in the A/D conversion result buffer 0. At this timing, a value stored in the A/D conversion result buffer 0 so far is transferred to the A/D conversion result buffer 1, a value stored in the A/D conversion result buffer 1 so far is transferred to the A/D conversion result buffer 2, and a value stored in the A/D conversion result buffer 2 so far is transferred to the A/D conversion result buffer 3. When such an A/D converter is arranged in the CPU 1 to perform the following process, an increase in process time, which is caused upon performing A/D conversion a plurality of times, can be prevented.

(1-1) First Method

Figure 8:
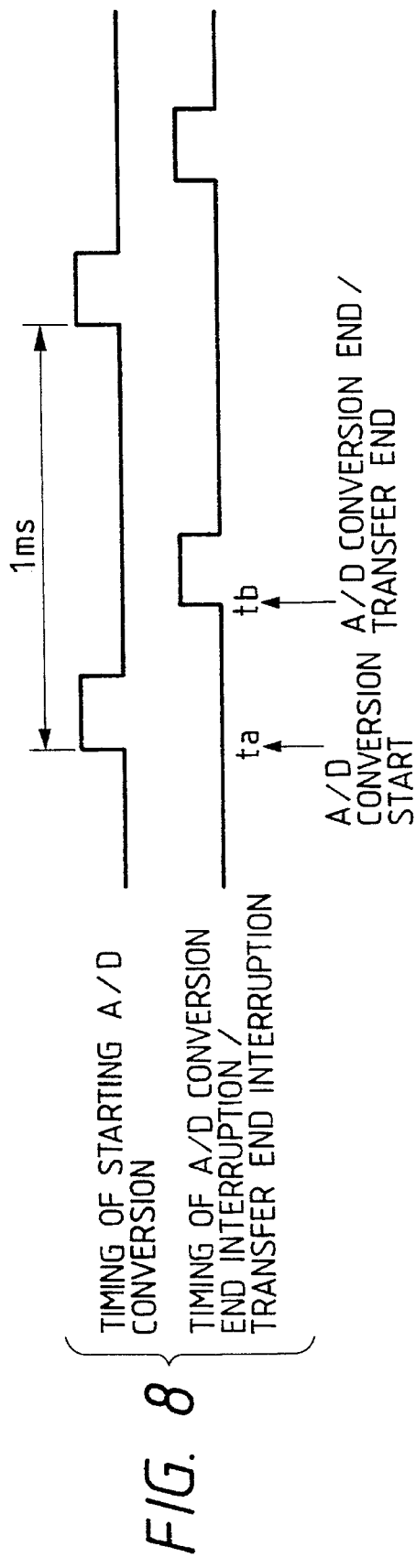
FIG. 8 is a chart showing the start timings of A/D conversion and A/D conversion end interruption or transfer end interruption of the present invention.
Figure 9:
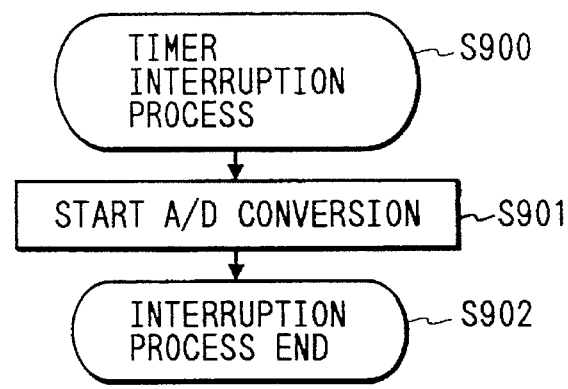
FIG. 9 is a flow chart showing the timer interruption process for starting A/D conversion of the present invention.
Figure 10:
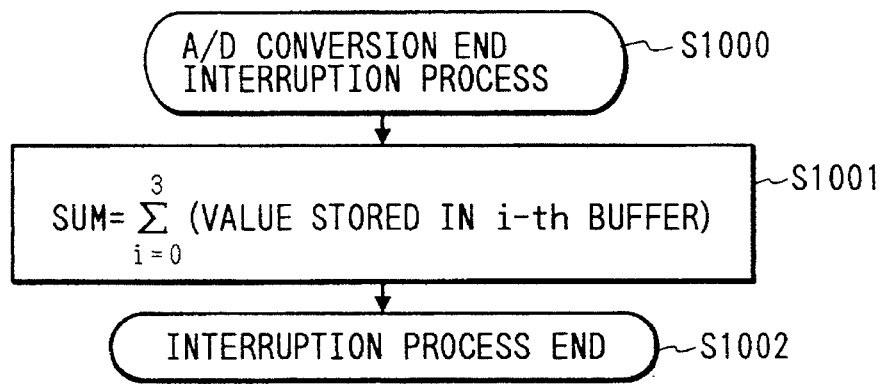
FIG. 10 is a flow chart showing the A/D conversion finish interruption process of the present invention.

The first method for the process will be described with reference to FIG. 8. A/D conversion is started at time ta and performed four times. When the four A/D conversion results are stored in all the A/D conversion result buffers 0 to 3, an A/D conversion end interruption is generated. With the A/D conversion end interruption process, the contents of the A/D conversion result buffers 0 to 3 are read out, and the sum thereof is calculated. In this case, the A/D converter shown in FIG. 4 starts A/D conversion by the program of the CPU 1. Upon completion of A/D conversion, the A/D conversion result from the A/D conversion unit is stored in the A/D conversion result buffer 0. At this time, the value stored in the A/D conversion result buffer 0 so far is transferred to the A/D conversion result buffer 1, the value stored in the A/D conversion result buffer 1 so far is transferred to the A/D conversion result buffer 2, and the value stored in the A/D conversion result buffer 2 so far is transferred to the A/D conversion result buffer 3. In this manner, A/D conversion is continuously performed four times. When the A/D conversion results are stored in all the A/D conversion result buffers, the A/D conversion end interruption process is started. A process of starting A/D conversion every predetermined time will be described below with reference to FIG. 9. The timer interruption process in FIG. 9 is repeatedly performed every predetermined time. This timer interruption process is started at an interval of, e.g., 1 ms. The process is started in step S900. The A/D converter starts to operate in step S901. The timer interruption process is ended in step S902. With this process, A/D conversion can be repeatedly performed every predetermined time. FIG. 10 shows an A/D conversion finish interruption process which is started when A/D conversion is started in step S901 in FIG. 9 and performed four times. The process is started at time tb in FIG. 8. The process is started in step S1000. The values of the A/D conversion result buffers 0 to 3 are read out in step S1001. The sum of the readout values is calculated and substituted in the value SUM. The A/D conversion finish interruption process is ended in step S1002. In this manner, with a process simpler than that shown in FIG. 7, the time required for the process can be shortened.

(1-2) Second Method

Figure 16:
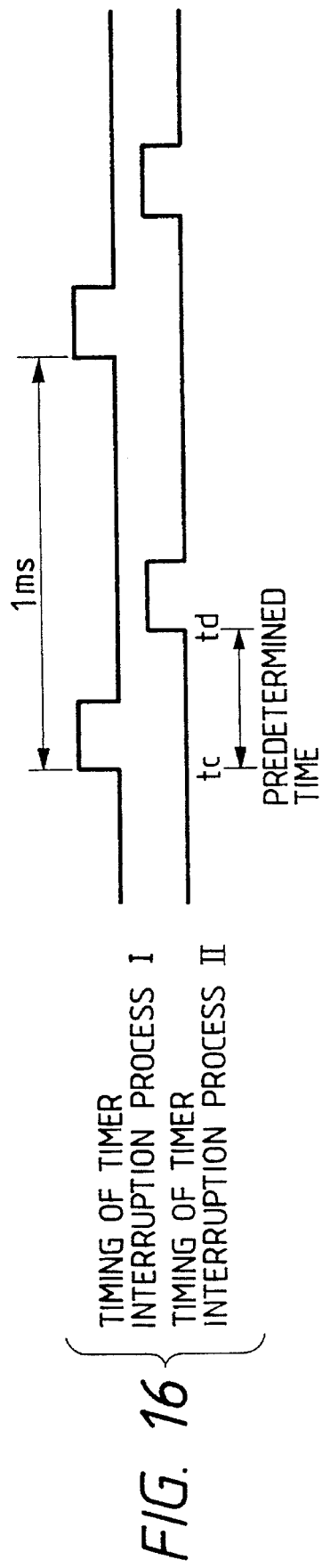
FIG. 16 is a chart showing the start timings of a timer interruption process I and a timer interruption process II of the present invention.
Figure 18:
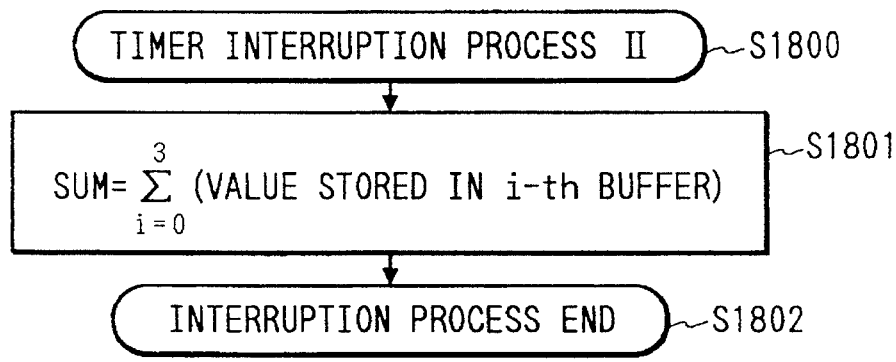
FIG. 18 is a flow chart showing the timer interruption process II of the present invention.

The second method will be described below with reference to FIG. 16. A/D conversion is started at time tc and performed four times. After a predetermined time longer than the time necessary for storing the four A/D conversion results in all the A/D conversion result buffers 0 to 3 (at time td), the contents of the A/D conversion results buffers 0 to 3 are read out. The A/D converter has the same arrangement as that in the first method. In the first method, the digitized values are read out by the A/D conversion finish interruption started when A/D conversion is performed four times. To the contrary, the second method is characterized in that the function of starting the A/D conversion finish interruption is unnecessary. The second method will be described below with reference to FIGS. 17 and 18. A timer interruption process I shown in FIG. 17 is repeatedly performed every predetermined time. This timer interruption process I is started at an interval of, e.g., 1 ms. A timer interruption process II shown in FIG. 18 is started after a predetermined time (longer than a time necessary for performing A/D conversion at least four times) for the timer interruption process I. The timer interruption process in FIG. 17 is started in step S1700. The A/D converter starts to operate in step S1701. The timer interruption process I is ended in step S1702. With this process, A/D conversion can be repeatedly performed every predetermined time. The timing at which the timer interruption process I is started corresponds to time tc in FIG. 16. The timer interruption process II shown in FIG. 18 is started in step S1800. In step S1801, the values of the A/D conversion result buffers 0 to 3 are read out, and the sum thereof is calculated and substituted in the value SUM. The timer interruption process II is ended in step S1802. In this manner, with a process simpler than that shown in FIG. 7, the time required for the process can be shortened.

(1-3) Third Method

Figure 13:
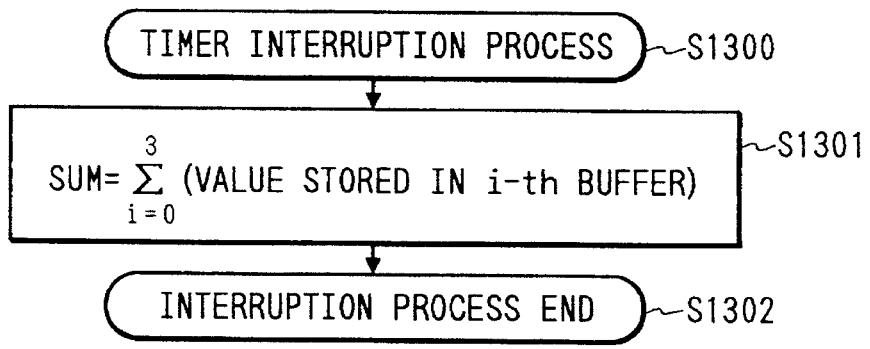
FIG. 13 is a flow chart showing the timer interruption process of the present invention.

The third method will be described below. In the third method, A/D conversion is started once, and thereafter, A/D conversion is repeatedly continuously performed until it is stopped. In this case, the A/D converter shown in FIG. 4 starts A/D conversion in accordance with a predetermined timing by the program of the CPU 1 and continuously performs A/D conversion. Every time A/D conversion is ended, the A/D conversion result is transferred to the A/D conversion result buffer 0. At the same time, the value of the A/D conversion result buffer 0 is transferred to the A/D conversion result buffer 1. At the same time, the value of the A/D conversion result buffer 1 is transferred to the A/D conversion result buffer 2. At the same time, the value of the A/D conversion result buffer 2 is transferred to the A/D conversion result buffer 3. In this manner, the A/D conversion results are sequentially transferred. When A/D conversion is ended once, the next A/D conversion is started. By repeating this process, four latest digitized values are always stored in the A/D conversion result buffers 0 to 3. When the contents of the A/D conversion result buffers are read out at an arbitrary timing, a camera shake amount is detected. This process will be described with reference to the flow chart in FIG. 13. A timer interruption process in FIG. 13 is repeatedly performed every predetermined time. This timer interruption process is started at an interval of, e.g., 1 ms. The process is started in step S1300. In step S1301, the values of the A/D conversion result buffers 0 to 3 are read out, and the sum thereof is calculated and substituted in the value SUM. The timer interruption process is ended in step S1302. Note that A/D conversion is started before the timer interruption process is started. In this manner, with a process simpler than that shown in FIGS. 9 and 10, or 17 and 18, the time required for the process can be shortened.

(2) Process of Incorporating a Plurality of A/D Input Terminals and an A/D Conversion Result Registers Corresponding to the A/D Input Terminals and Connecting the Output Terminal of the Vibration Detection Circuit to the Plurality of A/D Input Terminals In the following example, a one-chip microcomputer incorporating a plurality of A/D input terminals and A/D conversion result registers corresponding to the A/D input terminals is used, and the output terminal of the vibration detection circuit 5 is connected to the plurality of A/D input terminals. This example will be described with reference to FIG. 5. The A/D converter incorporated in the CPU 1 has four A/D input terminals ch0, ch1, ch2, and ch3. An A/D conversion result from the input terminal ch0 is stored in an A/D conversion result register 0. An A/D conversion result from the input terminal ch1 is stored in an A/D conversion result register 1. An A/D conversion result from the input terminal ch2 is stored in an A/D conversion result register 2. An A/D conversion result from the input terminal ch3 is stored in an A/D conversion result register 3. All the four A/D input terminals are connected to the output terminal of the vibration detection circuit 5. With this arrangement and the following process, an increase in process time, which is caused when A/D conversion is performed a plurality of times, is prevented.

(2-1) First Method

Figure 11:
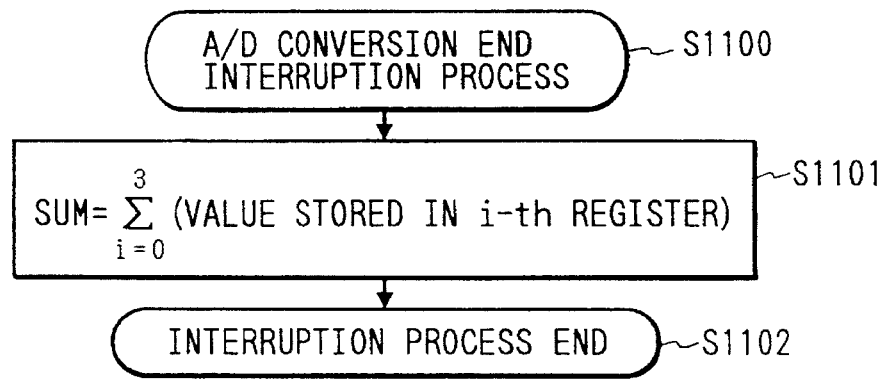
FIG. 11 is a flow chart showing the A/D conversion end interruption process of the present invention.

The first method for the process will be described below with reference to FIG. 8. A/D conversion is started at time ta and performed four times. When the four A/D conversion results are stored in all the A/D conversion result registers 0 to 3, an A/D conversion end interruption is generated. With the A/D conversion end interruption process, the contents of the A/D conversion result registers 0 to 3 are read out, and the sum thereof is calculated. In this case, the A/D converter shown in FIG. 5 starts A/D conversion by the program of the CPU 1. First of all, an input from the terminal ch0 is A/D-converted, and the result is stored in the A/D conversion result register 0. Subsequently, an input from the terminal ch1 is A/D-converted, and the result is stored in the A/D conversion result register 1. An input from the terminal ch2 is A/D-converted, and the result is stored in the A/D conversion result register 2. An input from the terminal ch3 is A/D converted, and the result is stored in the A/D conversion result register 3. When the A/D conversion result is stored in the A/D conversion result register 3, the A/D conversion end interruption process is started. A process of starting A/D conversion every predetermined time will be described below with reference to FIG. 9. A timer interruption process in FIG. 9 is repeatedly performed every predetermined time. This timer interruption process is started at an interval of, e.g., 1 ms. The process is started in step S900. The A/D converter starts to operate in step S901. The timer interruption process is ended in step S902. With this process, A/D conversion can be repeatedly performed every predetermined time. FIG. 11 shows an A/D conversion end interruption process which is started when A/D conversion is started in step S901 in FIG. 9 and performed four times. The process is started at time tb in FIG. 8. The process is started in step S1100. In step S1101, the values of the A/D conversion result registers 0 to 3 are read out, and the sum thereof is calculated and substituted in the value SUM. The A/D conversion end interruption process is ended in step S1102. In this manner, with a process simpler than that shown in FIG. 7, the time required for the process can be shortened.

(2-2) Second Method

Figure 19:
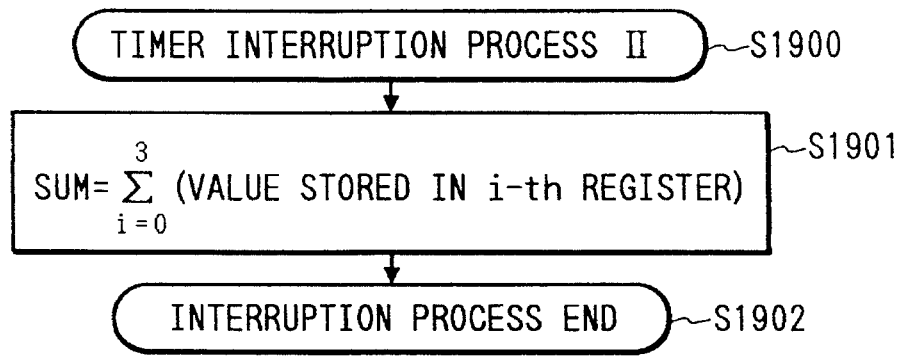
FIG. 19 is a flow chart showing the timer interruption process II of the present invention.

The second method will be described below with reference to FIG. 16. A/D conversion is started at time tc and performed four times. After a predetermined time longer than the time necessary for storing the four A/D conversion results in all the A/D conversion result registers 0 to 3 (at time td), the contents of the A/D conversion result registers 0 to 3 are read out. The A/D converter has the same arrangement as that in the first method. In the first method, the digitized values are read out by the A/D conversion end interruption which is started when A/D conversion is performed four times. To the contrary, the second method is Characterized in that the function of starting the A/D conversion end interruption is unnecessary. The second method will be described below with reference to FIGS. 17 and 19. The timer interruption process I shown in FIG. 17 is repeatedly performed every predetermined time. This timer interruption process I is started at an interval of, e.g., 1 ms. A timer interruption process II shown in FIG. 19 is started after a predetermined time (longer than a time necessary for performing A/D conversion at least four times) for the timer interruption process I. The timer interruption process I in FIG. 17 is started in step S1700. The A/D converter starts to operate in step S1701. The timer interruption process I is ended in step S1702. With this process, A/D conversion can be repeatedly performed every predetermined time. A timing at which the timer interruption process I is started corresponds to time tc in FIG. 16. The timer interruption process II shown in FIG. 19 is started in step S1900. In step S1901, the values of the A/D conversion result registers 0 to 3 are read out, and the sum thereof is calculated and substituted in the value SUM. The timer interruption process II is ended in step S1902. In this manner, with a process simpler than that shown in FIG. 7, the time required for the process can be shortened.

(2-3) Third Method

Figure 14:
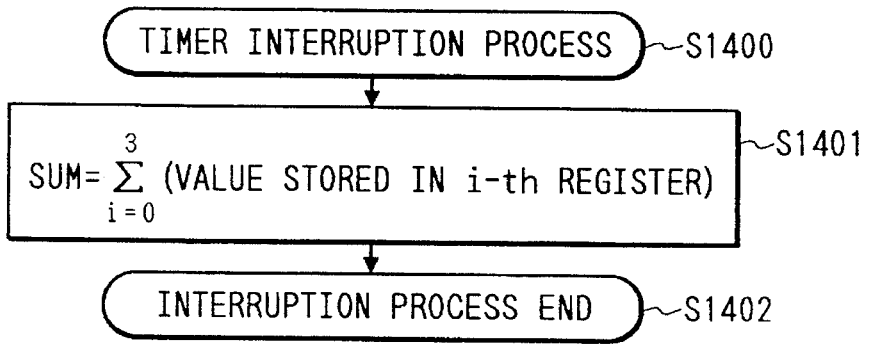
FIG. 14 is a flow chart showing the timer interruption process of the present invention.

The third method will be described below. In the third method, A/D conversion is started once, and thereafter, A/D conversion is repeatedly continuously performed until it is stopped. In this case, the A/D converter shown in FIG. 5 starts A/D conversion at a predetermined timing by the program of the CPU 1 and continuously performs A/D conversion. First of all, an input from the terminal ch0 is A/D-converted, and the result is stored in the A/D conversion result register 0. Subsequently, an input from the terminal ch1 is A/D-converted, and the result is stored in the A/D conversion result register 1. An input from the terminal ch2 is A/D-converted, and the result is stored in the A/D conversion result register 2. An input from the terminal ch3 is A/D-converted, and the result is stored in the A/D conversion result register 3. When A/D conversion of the input from the terminal ch3 is ended, A/D conversion of an input from the terminal ch0 is performed again. This process is repeatedly continuously performed. With this process, four latest digitized values are always stored in the A/D conversion result registers 0 to 3. When the contents of the A/D conversion result registers are read out at an arbitrary timing, a camera shake amount can be detected. This process will be described with reference to the flow chart in FIG. 14. A timer interruption process in FIG. 14 is repeatedly performed every predetermined time. This timer interruption process is started at an interval of, e.g., 1 ms. The process is started in step S1400. In step S1401, the values of the A/D conversion result registers 0 to 3 are read out, and the sum thereof is calculated and substituted in the value SUM. The timer interruption process is ended in step S1402. Note that A/D conversion is started before the timer interruption process is started. In this manner, with a process simpler than that shown in FIG. 7, FIGS. 9 and 11, or 17 and 19, the time required for the process can be shortened.

Assume that the A/D conversion characteristics vary between the A/D input terminals, e.g., characteristics such as a linearity error or quantization variations vary between the input terminals. In this case, when the sum of the A/D conversion results of the four input terminals is calculated as described above, the variations in characteristics can be canceled.

(3) Process of Automatically Transferring an A/D Conversion Result to a Plurality of Data Areas of a RAM upon Completion of A/D Conversion The following example is a process using a one-chip microcomputer having an automatic data transfer function in which an A/D conversion result is automatically transferred to a predetermined data area (a memory incorporated in the CPU 1, and more specifically, a RAM) through an internal data bus without any program process upon completion of A/D conversion. The CPU 1 having the above-described automatic data transfer function is used. This example will be described with reference to FIG. 6. The A/D converter incorporated in the CPU 1 starts A/D conversion at a predetermined timing. The A/D conversion result is stored in the A/D conversion result register. When the A/D conversion result is stored in the A/D conversion result register, the data is accordingly stored in a predetermined data area via the internal bus. With this arrangement and the following process, an increase in process time, which is caused when A/D conversion is performed a plurality of times, can be prevented.

(3-1) First Method

Figure 12:
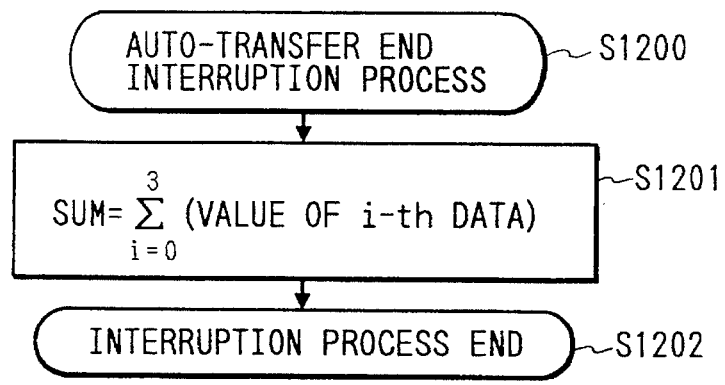
FIG. 12 is a flow chart showing the auto-transfer end interruption process of the present invention.

The first method for the process will be described with reference to FIG. 8. A/D conversion is started at time ta and performed four times. When the four A/D conversion results are automatically transferred to predetermined data areas, i.e., A/D conversion result data 0 to 3 in FIG. 6, a transfer end interruption is generated. With the transfer end interruption process, the contents of the A/D conversion result data 0 to 3 are read out, and the sum thereof is calculated. In this case, the automatic data transfer function shown in FIG. 6 is operated as follows. Upon completion of A/D conversion, the content of the A/D conversion register corresponding to the first portion of the data area is automatically transferred to the A/D conversion result data 0. Subsequently, A/D conversion is performed, and upon completion of the second A/D conversion, the content of the A/D conversion result register is automatically transferred to the A/D conversion result data 1. Subsequently, A/D conversion is performed, and upon completion of the third A/D conversion, the content of the A/D conversion result register is automatically transferred to the A/D conversion result data 2. Subsequently, A/D conversion is performed, and upon completion of the fourth A/D conversion, the content of the A/D conversion result register is automatically transferred to the A/D conversion result data 3. Thereafter, the transfer end interruption process is started. A process of starting A/D conversion every predetermined time will be described below with reference to FIG. 9. The timer interruption process in FIG. 9 is repeatedly performed every predetermined time. The timer interruption process is started at an interval of, e.g., 1 ms. The process is started in step S900. The A/D converter starts to operate in step S901. The timer interruption process is ended in step S902. With this process, A/D conversion can be repeatedly performed every predetermined time. FIG. 12 shows an auto-transfer end interruption process which is started when A/D conversion is started in step S901 and performed four times, and the A/D conversion result is automatically transferred to a predetermined data area. The process is started at time tb in FIG. 8. The process is started in step S1200. In step S1201, the values of the A/D conversion result data 0 to 3 are read out, and the sum thereof is calculated and substituted in the value SUM. The auto-transfer end interruption process is ended in step S1202. In this manner, with a process simpler than that shown in FIG. 7, the time required for the process can be shortened.

(3-2) Second Method

Figure 20:
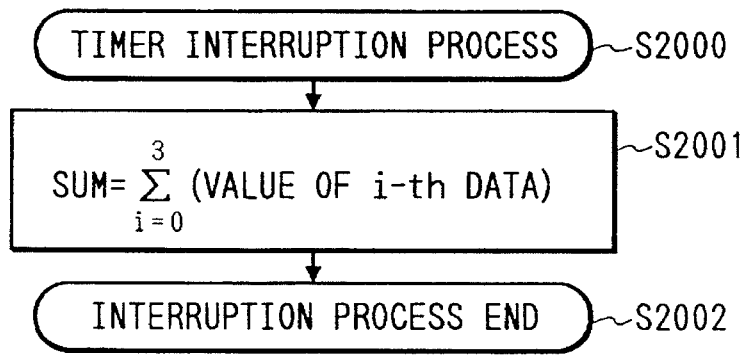
FIG. 20 is a flow chart showing the timer interruption process II of the present invention.

The second method will be described below with reference to FIG. 16. A/D conversion is started at time tc and performed four times. After a predetermined time longer than a time necessary for transferring the four A/D conversion results to all the A/D conversion result data 0 to 3 (at time td), the contents of the A/D conversion result data 0 to 3 are read out. The A/D converter has the same arrangement as that in the first method. In the first method, the digitized values are read out by the auto-transfer end interruption process which is started when A/D conversion is performed four times, and the four A/D conversion results are automatically transferred. To the contrary, the second method is characterized in that the function of starting the auto-transfer end interruption process is unnecessary. The second method will be described below with reference to FIGS. 17 and 20. The timer interruption process I shown in FIG. 17 is repeatedly performed every predetermined time. The timer interruption process I is started at an interval of, e.g., 1 ms. A timer interruption process II shown in FIG. 20 is started after a predetermined time (longer than a time necessary for performing A/D conversion at least four times and automatically transferring the four A/D conversion results) for the timer interruption process I. The timer interruption process I in FIG. 17 is started in step S1700. The A/D converter starts to operate in step S1701. The timer interruption process I is ended in step S1702. With this process, A/D conversion can be repeatedly performed every predetermined time. A timing at which the timer interruption process I is started corresponds to time tc in FIG. 16. The timer interruption process II shown in FIG. 20 is started in step S2000. In step S2001, the values of the A/D conversion data 0 to 3 are read out, and the sum thereof is calculated and substituted in the value SUM. The timer interruption process II is ended in step S2002. In this manner, with a process simpler than that shown in FIG. 7, the time required for the process can be shortened.

(3-3) Third Method

The third method will be described below. In the third method, A/D conversion is started once, and thereafter, A/D conversion is repeatedly continuously performed until it is stopped. In this case, the A/D converter shown in FIG. 6 starts A/D conversion at a predetermined timing by the program of the CPU 1 and continuously performs A/D conversion. Every time A/D conversion is ended, the value of the A/D conversion result register is automatically transferred to a predetermined data area, i.e., the A/D conversion result data 0 to 3 in FIG. 6. The order is as follows. After the start of A/D conversion, the first A/D conversion result is transferred to the A/D conversion result data 0. The second A/D conversion result is transferred to the A/D conversion result data 1. The third A/D conversion result is transferred to the A/D conversion result data 2. The fourth A/D conversion result is transferred to the A/D conversion result data 3. The fifth A/D conversion result is transferred to the A/D conversion result data 0. Similarly, the A/D conversion result is automatically transferred. With this arrangement, four latest digitized values are always stored in the A/D conversion result data 0 to 3. When the contents of the A/D conversion result data are read out at an arbitrary timing, a camera shake amount can be detected. This process will be described with reference to the flow chart in FIG. 15. The timer interruption process in FIG. 15 is repeatedly performed every predetermined time. The timer interruption process is started at an interval of, e.g., 1 ms. The process is started in step S1500. In step S1501, the values of the A/D conversion result data 0 to 3 are read out, and the sum thereof is calculated and substituted in the value SUM. The timer interruption process is ended in step S1502. Note that A/D conversion is started before the timer interruption process is started. In this manner, with a process simpler than that shown in FIG. 7, or FIGS. 9 and 12 or 17 and 20, the time required for the process can be shortened.

An output from the vibration detection circuit 5 is detected by using any one of the above-described processes. On the basis of the sum value SUM of the A/D conversion results, rotation of the motor 4 is controlled and converted into a linear motion by an appropriate gear (not shown) or the like to drive the vibration correction lens 8, thereby precisely performing vibration reduction. The A/D converter shown in FIGS. 4 to 6 for the above description has a resolution of 10 bits. However, when an A/D converter with a 12-bit resolution is used, more precise detection can be performed. Even when an A/D converter with an 8-bit resolution is used, the influence of high-frequency noise overlapping the vibration signal output from the vibration detection circuit 5 can be effectively reduced. In this embodiment, the influence of the high-frequency noise is suppressed by calculating the sum of the four A/D conversion results. However, the number of times of A/D conversion is not limited to this. The number of A/D conversion result buffers in FIG. 4, the number of A/D conversion result registers in FIG. 5, or the number of automatically transferred A/D conversion result data in FIG. 6 is not limited to four. As this number increases, the influence of the high-frequency noise can be more effectively eliminated.

As shown in this embodiment, when a plurality of A/D conversion result buffers, A/D conversion result registers, or automatically transferred A/D conversion result data are arranged, and also when a one-chip microcomputer having only a single A/D conversion result buffer, A/D conversion result register, or A/D conversion result data is used, according to the present invention, the A/D conversion result is read out after the A/D conversion result is stored in the A/D conversion result buffer or A/D conversion result register, or after the A/D conversion result is automatically transferred to a predetermined data area. For this reason, no wait time is required during A/D conversion. As for the process speed of the one-chip microcomputer, the present invention is advantageously applied to simultaneously perform vibration detection and another process such as control of a shutter (not shown) during exposure.

In this embodiment, the vibration detection circuit 5 detects an angular velocity generated in a camera using an angular velocity sensor. However, the present invention is not limited to this. A vibration detection circuit for outputting a signal having an acceleration generated by vibrations or a positional dimension may also be used. In addition, as a vibration reduction mechanism, a method has been described in which the motor 4 is driven to shift the correction lens 8 as one of the photographing lenses and change the optical axis, thereby reducing the vibrations on the image surface. Alternatively, a variable angle prism may be used in place of the correction lens 8. An actuator such as a voice coil can also be used in place of the motor 4.

In this embodiment, a camera has been exemplified as a target detection object. However, the target detection object for vibration detection is not limited to the camera. For example, a binocular or telescope, or a general machine tool may also be a target detection object for vibration detection.

As has been described above, according to the present invention, with a relatively simple process, an error due to the resolution of the A/D converter, or the influence of high-frequency noise generated in the vibration detection circuit is eliminated to improve the vibration detection precision and the process efficiency, thereby allowing precise vibration reduction and preventing an increase in cost.

What is claimed is:

1. A vibration detection apparatus for a target detection object, comprising:

a vibration detector to detect a vibration of the target detection object and to output a signal corresponding to the vibration; and a one-chip microcomputer to control the target detection object to compensate for the vibration and incorporating an A/D converter having a resolution of at least 10 bits, said A/D converter performing A/D conversion of the signal from said vibration detector.

2. An apparatus according to claim 1, wherein the target detection object comprises a camera having:
- a photographing optical system with a changeable optical axis;
- a drive to change the optical axis of said photographing optical system; and
- a drive controller to control said drive, wherein said one-chip microcomputer outputs a control signal to said drive controller in accordance with an A/D conversion result of the signal from said vibration detector.

3. An apparatus according to claim 1, wherein said one-chip microcomputer causes the A/D converter to perform the A/D conversion of the signal from said vibration detector a plurality of times.

4. An apparatus according to claim 3, wherein the target detection object comprises a camera having:
- a photographing optical system with a changeable optical axis;
- a drive to change the optical axis of said photographing optical system; and
- a drive controller to control said drive, wherein said one-chip microcomputer outputs a control signal to said drive controller in accordance with an A/D conversion result of the signal from said vibration detector.

5. A vibration detection apparatus for a target detection object, comprising:
- a vibration detector to detect a vibration of the target detection object and to output a signal corresponding to the vibration;
- a one-chip microcomputer to control the target detection object to compensate for the vibration; and
- an A/D converter disposed within said one-chip microcomputer and having a resolution of at least 10 bits to A/D convert the signal from said vibration detector into an A/D converted signal, said one-chip microcomputer storing a plurality of A/D converted signals and controlling the target detection object to compensate for the vibration based on a sum of the plurality of A/D converted signals stored.

6. An apparatus as recited in claim 5, wherein said one-chip microcomputer includes a plurality of A/D conversion result buffers to store the plurality of A/D converted signals.

7. An apparatus as recited in claim 5, wherein said A/D converter includes a plurality of vibration signal input channels to receive a plurality of signals from said vibration detector,
said A/D converter converts the plurality of signals from said vibration detector into the plurality of A/D converted signals, and
said one-chip microcomputer includes a plurality of A/D conversion result registers to store the plurality of A/D converted signals.

8. An apparatus as recited in claim 5, wherein said one-chip microcomputer includes a random access memory to store the plurality of A/D converted signals.

9. An apparatus as recited in claim 5, wherein
said A/D converter converts the signal from said vibration detector after a timer interrupt, and
said one-chip microcomputer stores one of the plurality of A/D converted signals after each of a predetermined number of timer interrupts and calculates the sum of the plurality of A/D converted signals after an A/D conversion end interruption, the A/D conversion end interruption being generated after the plurality of A/D converted signals is stored, and the plurality of A/D converted signals correspond to the predetermined number of timer interrupts.

10. An apparatus as recited in claim 5, wherein
said A/D converter converts the signal from said vibration detector after a first timer interrupt, and
said one-chip microcomputer stores one of the plurality of A/D converted signals after each of a predetermined number of first timer interrupts and calculates the sum of the plurality of A/D converted signals after a second timer interrupt, the second timer interrupt being generated after a predetermined time longer than a time for storing the plurality of A/D converted signals, and the plurality of A/D converted signals correspond to the predetermined number of first timer interrupts.

11. An apparatus as recited in claim 5, wherein
said A/D converter converts the signal from said vibration detector after a timer interrupt, and
said one-chip microcomputer stores one of the plurality of A/D converted signals after the timer interrupt and calculates the sum of the plurality of A/D converted signals after a predetermined number of latest A/D converted signals is stored.

12. A method for detecting vibration of a target detection object, comprising the steps of:
- detecting a vibration and outputting a signal corresponding to the vibration;
- converting the signal into an A/D converted signal by an A/D converter having a resolution of at least 10 bits and disposed within a one-chip microcomputer;
- storing a plurality of A/D converted signals;
- calculating a sum of the plurality of A/D converted signals; and
- controlling the target detection object with the one-chip microprocessor to compensate for the vibration based on the sum of the plurality A/D converted signals.

13. A method as recited in claim 12, wherein said storing step stores the plurality of A/D converted signals in a plurality of A/D conversion result buffers disposed in the one-chip microcomputer.

14. A method as recited in claim 12, further comprising the step of receiving a plurality of signals via a plurality of vibration signal input channels disposed in the A/D converter, and
wherein said converting step converts the plurality of signals to the plurality of A/D converted signals, and said storing step stores the plurality of A/D converted signals in a plurality of A/D conversion result registers.

15. A method as recited in claim 12, wherein said storing step stores the plurality of A/D converted signals in a random access memory disposed in the one-chip microcomputer.

16. A method as recited in claim 12, wherein
said converting step converts the signal after a timer interrupt,
said storing step stores one of the plurality of A/D converted signals after each of a predetermined number of timer interrupts, and
said calculating step calculates the sum of the plurality of A/D converted signals after an A/D conversion end interruption generated after the plurality of A/D converted signals, corresponding to the predetermined number of timer interrupts, is stored.

17. A method as recited in claim 12, wherein said converting step converts the signal after a first timer interrupt, said storing step stores one of the plurality of A/D converted signals after each of a predetermined number of first timer interrupts, and said calculating step calculates the sum of the plurality of A/D converted signals after a second timer interrupt generated after a predetermined time longer than a time for said storing of the plurality of A/D converted signals corresponding to the predetermined number of first timer interrupts.

18. A method as recited in claim 12, wherein said converting step converts the signal after a timer interrupt, said storing step stores each one of the plurality of A/D converted signals after the timer interrupt, and said calculating step calculates the sum of the plurality of A/D converted signals after a predetermined number of latest A/D converted signals is stored.

* * * * *